J. POLÁK.
ELECTRIC WATER HEATER.
APPLICATION FILED FEB. 1, 1913.
1,079,185.
Patented Nov. 18, 1913.
2 SHEETS—SHEET 1.
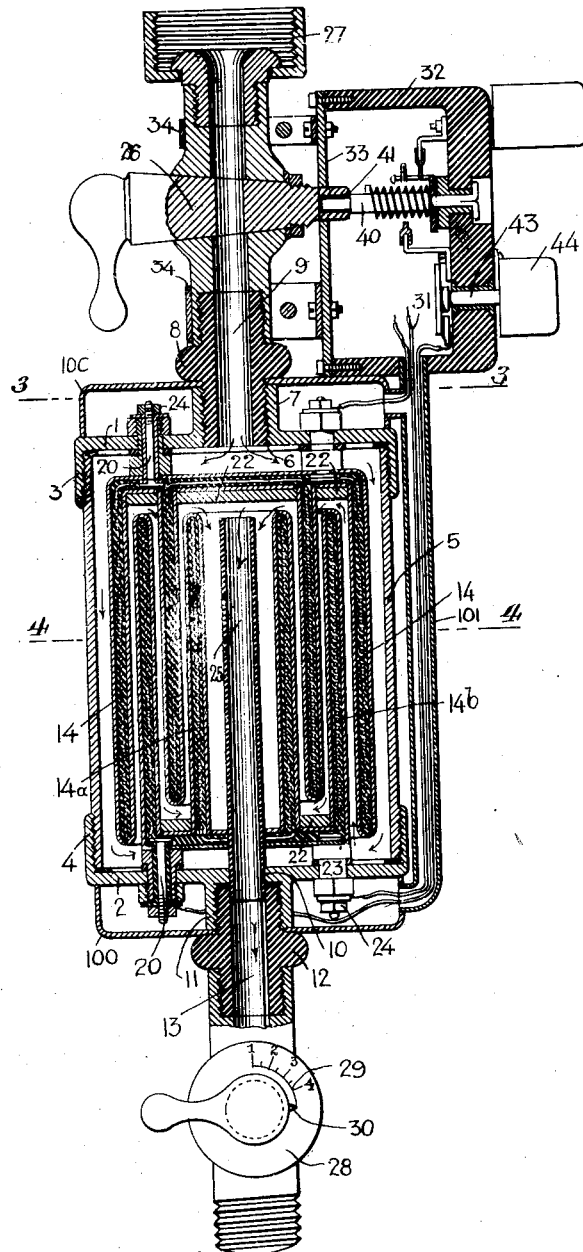
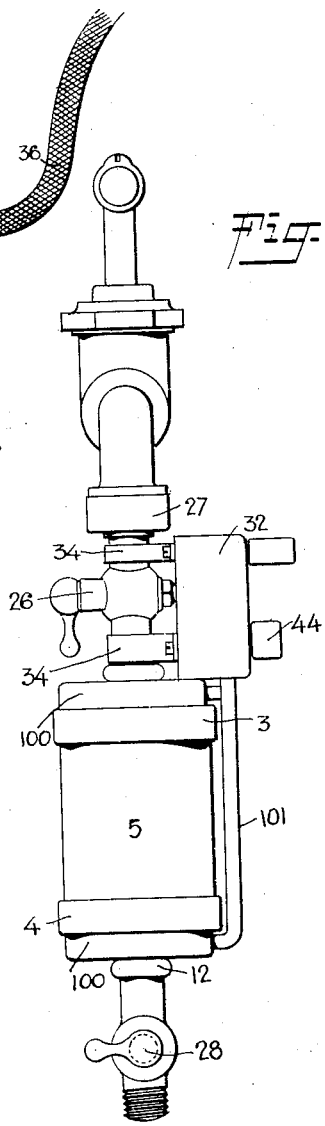
WITNESSES
INVENTOR
Joseph Polák
BY
ATTORNEYS

J. POLÁK.
ELECTRIC WATER HEATER.
APPLICATION FILED FEB. 1, 1913.

1,079,185.

Patented Nov. 18, 1913.

2 SHEETS—SHEET 2.

WITNESSES

INVENTOR
Joseph Polák
BY
ATTORNEYS

UNITED STATES PATENT OFFICE.

JOSEPH POLÁK, OF NEW YORK, N. Y.

ELECTRIC WATER-HEATER.

1,079,185.  Specification of Letters Patent.  Patented Nov. 18, 1913.

Application filed February 1, 1913. Serial No. 745,610.

*To all whom it may concern:*

Be it known that I, JOSEPH POLÁK, a citizen of the United States, and a resident of the city of New York, borough of Brooklyn, in the county of Kings and State of New York, have invented a new and Improved Electric Water-Heater, of which the following is a full, clear, and exact description.

This invention relates generally to electric water heaters, and is more particularly directed to a structure characterized by a number of communicating chambers, wherein the heating elements and the liquid to be heated are contained, the heating elements being entirely surrounded by the said liquid.

The principal object of the invention is to provide a new and improved electric water heater characterized by a number of concentrically arranged heating elements, the spaces between them forming chambers through which water flows, the heating elements being surrounded on all sides by the water, means being provided whereby the volume and temperature of the liquid may be regulated or controlled.

A further object of the invention is the provision of an electric water heater embodying a device wherein any number of heating units may be assembled in order to provide a heater varying in size and capacity.

Other objects and advantages following the use of the inventive idea will appear as the description of the preferred embodiment thereof proceeds.

Reference is to be had to the accompanying drawings forming a part of this specification, in which similar characters of reference indicate corresponding parts in all the views, and in which—

Figure 3:
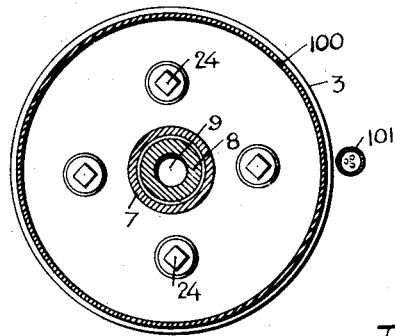
Figure 4:
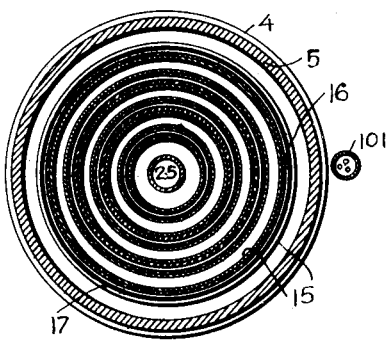
Figure 5:
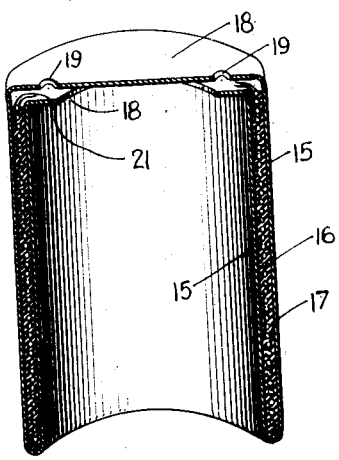
Figure 6:
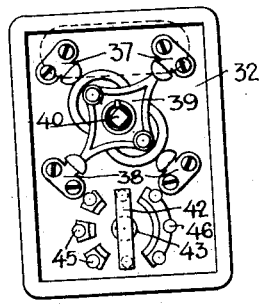
Figure 7:
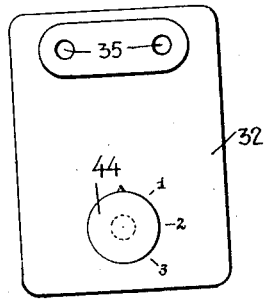

Figure 1 is an elevation of the heater in operative relation with a faucet, showing the general exterior appearance of the device; Fig. 2 is a vertical sectional view of the heater; Fig. 3 is a horizontal sectional view on the line 3—3 of Fig. 2; Fig. 4 is a sectional view on the line 4—4 of Fig. 2; Fig. 5 is a vertical sectional view in perspective of one of the heating elements; while Fig. 6 is an elevation of the back of the switch and rheostat combined; and Fig. 7 is an elevation of the front of the same.

It is, of course, clear that the size of the heater as a whole, and the appearance and design of the several elements which enter into its makeup, may be widely varied in order to provide structures adapted to different uses without departing from the inventive idea disclosed.

The heater comprises the ends 1—2 provided with peripheral flanges 3—4 which are threaded on the interior side, the threaded portions engaging the shell 5 of the heater, the said shell serving to contain the heating elements and to provide the paths for the flow of water therethrough. The end 1, which may also be termed the top, is provided with a central opening 6, adjacent which is a shoulder 7, threaded on its interior and receiving a bushing 8 which may be of insulating material if so desired; this bushing is provided with a passageway 9 extending therethrough, adapted to convey the liquid to be heated. The end 2, which may also be termed the bottom, is provided with an opening 10, the end of the member being provided with a shoulder 11 which is counterbored and threaded on its interior, and adapted to receive the threaded end of a bushing 12 which may be made of insulating material if so desired. This bushing is provided with a passageway 13 extending therethrough adapted to convey the liquid after heating.

Within the heater, and suitably maintained in position, are a number of heating elements 14, the particular form of each of which is shown in Fig. 5, it being noted that these elements are concentrically arranged and suitably spaced, whereby a continuous passage for the liquid through the heater is provided, the outer heating element 14 being spaced from the shell or casing 5, so that when liquid is passing through the heater the said elements are surrounded on all sides by the liquid.

Referring particularly to Fig. 5, wherein the preferred form of the heating element is set forth, it will be noted that it is composed of spaced cylindrical portions 15, between which is the heating element proper 16, which may be in the form of wire or other shaped material insulated from the said portions 15 in any suitable manner, preferably by means of a compound 17, which incloses the heating element and prevents short-circuiting thereof with the said portions 15. One end of each of the said portions 15 are connected by means of end pieces 18, the top one of which is preferably provided with openings 19 into which a binding post 20 is adapted to be passed (Fig. 2) and into communication with the ends 21 of the said heating element. These superposed pieces 18 form a drum in communication with the space inclosing the heating element 16.

It will be noted from Fig. 2 that the successive elements 14 are of varying diameters, whereby they may be nested as is shown; the particular arrangement shown in Fig. 2 discloses the inner heating element 14$^a$ and the adjacent heating element 14$^b$ of substantially cylindrical form, and projecting from the ends 18 common to both; this structure, of course, is arbitrary and may be widely varied in practice in order to arrive at the most efficient design. Since the heating element proper is positioned between the parts 15 of the element the spaces between the ends 18 of each element serve merely to conduct the leads. A number of insulating portions 22 are provided adjacent these ends 18 whereby undue radiation from the heated liquid is prevented.

The particular form of the binding post which is used to convey current to the heating coil is, of course, immaterial, it being noted however, that the binding post and its coöperating structure also afford means for properly positioning the heating coils within the heater. To this end the top 1 and bottom 2 are provided with openings through which metallic bushings 23 are passed, the binding post 20 being passed through the bushing and the parts secured in position by means of the nuts 24. The structure thus far described provides an entrance for water into the heater, and also provides a circuitous path for the water through the heater, as indicated by the arrows in Fig. 2, the outlet being also embodied; in order to reduce the volume of water in the inner chamber and expose a larger surface to the heating effect from the inner heating coil, an upstanding pipe 25 is provided which communicates with the passageway 13 in the bushing 12.

In screw threaded engagement with the upper end of the bushing 8 is a valve or cock 26, whereby the admission of liquid to the heater is controlled, the upper end of the cock being provided with a coupling 27, whereby the heater may be secured on a faucet. In screw threaded engagement with the lower end of the bushing 12 is a valve 28, whereby the passage of water from the heater may be regulated and the temperature controlled, the outer side thereof being preferably provided with a dial 29, the handle of the valve being provided with an index 30 which relatively to the scale 29 will indicate relative temperatures of the water leaving the heater.

The heating coils may be placed in communication with a source of electrical supply in any convenient manner through the medium of the conductors 31; it is also clear that any form of regulating means may be employed to vary the intensity of the current to the coils. However, I have disclosed a rheostat and switch, the switch coöperating with the cock 26, whereby the control of the electric current may be effected. The particular form of this switch and rheostat is set forth in Figs. 2, 6 and 7; a suitable casing 32 having a removable side 33 is carried by the heater through the medium of straps 34 which are fixed to the said cock 26 as shown; this casing is provided with openings 35 whereby the terminals of a conductor 36 may enter therein into electrical contact with the fixed studs 37 contained within the casing. These studs, together with the studs 38 and the movable blade 39 mounted on the shank 40, form in effect a double-pole switch. It is, of course, clear that any form of switch may be used, that shown, however, contemplating actuation by the handle of the cock 26, the inner end of the movable member of the cock being provided with an opening 41 which receives the end of the shank 40 so that turning the movable member in order to permit water to flow through the heater will also close the switch and permit electric current to flow through the coil. This casing 32 carries a movable blade 42 mounted on a spindle 43, at the outer end of which is a handle 44, whereby the blade may be brought into contact with one end of the fixed studs 45, the number of studs being substantially equal to the number of heating coils, so that if one of the terminals of one heating coil is brought to one stud, and the other ends of the heating coils are brought to the studs 46, the different positions of the blade will determine the number of heating coils which are in circuit, whereby the heating effect may be varied. This rheostat is merely one form which may be used.

The heater is attached to the faucet or other source of supply through manipulation of the coupling 27; the conductor 36 is engaged with a source of current, and when the cock 26 is opened to permit water to enter the heater the switch 39 will also be actuated, with the consequent heating of the liquid. The temperature and amount of liquid issuing from the heater may be controlled through manipulation of the valve 28.

As seen from the drawings the fluid entering from the top of the heater is caused to flow from and between heating elements of large contacting area to elements of smaller area and out through the outlet 13. The path of the liquid is therefore from the wall of the casing toward the center of same, and as this liquid travels in the way stated it is gradually increased in temperature and consequently the hotter liquid is located in the central portion of the casing and the amount of heat that would be lost by radiation is reduced to a minimum.

The appearance of the heater is pleasing, and the arrangement of the parts is such that a compact structure is provided, all of the parts being inclosed, the binding posts and wires being protected by means of the casing 100 and the conduit 101, so that the device is practically of such structure that chances of injury thereto are reduced to a minimum.

Having thus described my invention, what I claim as new and desire to secure by Letters Patent is:—

1. A heater comprising a casing having removable end flanges, one of said flanges having a fluid inlet and the second of said flanges having a fluid outlet, said inlet and outlet lying in the axis of said casing, and a plurality of concentric electrically heated elements secured to each of said flanges and projecting into said casing, said elements of one of said flanges engaging between the elements of the second of said flanges, means for controlling the fluid inlet and the fluid outlet, and means for controlling the heating effect of said elements.

2. A heater comprising a casing having removable end flanges, one of said flanges having a fluid inlet and the second of said flanges having a fluid outlet, a series of concentric electrically heated elements alternately secured to said flanges and intermediate and in alinement with said inlet and outlet, said heating elements being so disposed that the fluid flowing from said inlet to said outlet is gradually heated when flowing between said elements toward the center of the casing, thereby reducing the amount of heat radiation by said casing.

3. A heater, comprising a casing having removable end flanges, one of said flanges having an inlet and the second of said flanges having an outlet; a series of concentric electrically heated elements in said casing; oppositely disposed drums connecting the alternate heating elements together and communicating therewith, each drum having means whereby it is secured to the end flange and thereby when the flange is removed from the casing the drum and the heating elements secured thereto are removed therewith; and insulating means secured to said drum adjacent said heating elements.

In testimony whereof I have signed my name to this specification in the presence of two subscribing witnesses.

JOSEPH POLÁK.

Witnesses:
RUDOLPH C. GROENNEWICH,
GABRIEL TESAR.